Figure 1:
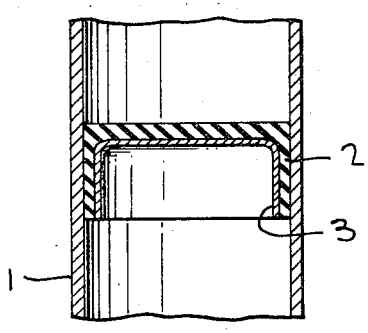

United States Patent [19]

DeCarbon

[11] 3,730,060
[45] May 1, 1973

[54] FLOATING PISTONS

[76] Inventor: Christian Bourcier DeCarbon, 64 Boulevard Maurice Barres, Neuilly-sur-Seine, France

[22] Filed: Oct. 26, 1970

[21] Appl. No.: 83,708

[52] U.S. Cl. ................................. 92/249, 267/64 R
[51] Int. Cl. ................................................ F16j 1/00
[58] Field of Search ...................... 92/248, 249, 245, 92/241, 254, 240; 267/64; 138/31; 277/212 C

[56] References Cited

UNITED STATES PATENTS

| | | | |
|---|---|---|---|
| 2,315,944 | 4/1943 | Dick | 92/249 X |
| 2,459,562 | 1/1949 | La Brie | 92/245 |
| 2,727,471 | 12/1955 | Martin | 92/254 X |
| 3,269,718 | 8/1966 | DeCaron | 267/64 R |

Primary Examiner—Irwin C. Cohen
Assistant Examiner—Irwin C. Cohen
Attorney—Watson, Cole, Grindle & Watson

[57] ABSTRACT

The piston is of metal reinforced elastomeric material of substantially cup-shaped configuration having its base of a thickness resilient to ballooning or excessive flexure under pressure, and being of a diameter slightly greater than the internal diameter of the cylinder in which it moves. The base having true cylindrical marginal bearing surfaces bounded by sharply angular axial edges and constituting only a relatively small portion of the total height of the piston. The greater portion of the axial extent of the piston is comprised by an annular flange portion of only slightly less diameter than that of the cylinder, the flange portion serving as a guiding means for installing the piston and being reinforced by a tubular metal piece which also abuts a portion of the base of the piston.

2 Claims, 5 Drawing Figures

Patented May 1, 1973 3,730,060

3,730,060

FLOATING PISTONS

The present invention relates to improvements made in floating pistons used as separators between two fluids such as two liquids or a liquid and a gas, said separators having to move inside cylinders under the effect of a difference in pressure on both sides of their faces. It applies more particularly to separators used in oleopneumatic monotube shock absorbers.

The difficulty in making pieces of this type lies in the choice of a system that combines good fluid tightness in both directions with a good lubrication of the rubbing part assuring the fluid tightness and which must be guided in the cylinder in a satisfactory way to obtain a gentle sliding and consequently a slight wear and limited differences in pressure in functioning. Further, diffusion of the gas through the floating piston has to be avoided.

Floating pistons intended to meet these needs are already known through French Pat. No. 1,055,443 of May 5, 1952 and U.S. Pat. No. 3,269,718 of Aug. 30, 1966.

These two inventions which already constituted important progress in relation to existing solutions, still have a certain number of imperfections. Actually, the flexible piston, shown in FIG. 3 of French Pat. No. 1,055,443 does not comprise a metal reinforcement so that there is no guiding during sliding. Further, an uncontrolled interference of the deformation of the flexible base with the zone of fluid tightness occurs.

On the contrary, the flexible piston of U.S. Pat. No. 3,269,718 comprises a metal reinforcement which assures stability, but it does not directly assure guiding. This function is assured by two fluid tightness beads with a toric surface.

Practice has shown, however, that a toric fluid tight surface assures a less good fluid tightness and presents a more rapid wear than a cylindrical fluid tight surface.

Another drawback of this arrangement is made up by the large surface and the slight thickness of the deformable membrane which leads to a quite rapid diffusion of the gas contained in the chamber.

Also, in the case of this patent there is an imbalance between the elasticity of the membrane, on the one hand, and the sliding force of the piston, on the other hand.

An effort has been made to find a satisfactory solution to these problems by making a floating piston such as shown in FIG. 1 of the present application. As can be seen from this drawing, the floating piston is made up of a reinforcement in the shape of a cup 3 covered on the outside with rubber 2 or the like. However, this embodiment is no longer satisfactory, because either fitting can be given to the piston in cylinder 1 so that it will move easily, then the fluid tightness is poor, or else, sufficient tight fitting is given to obtain a perfect fluid tightness, but then there is too much friction between rubber 2 and cylinder 1 and the piston moves with difficulty. Actually, lubricating the rubbing surfaces is very bad because of too much tight fitting, all the more so in this case since the rubber has a tendency to adhere to the surface of cylinder 1 by a sticking action.

The present invention aims at preventing these drawbacks, and has for its object improvements made in floating pistons used as separators between two fluids such as a gas and a liquid, particularly in oleopneumatic monotube shock absorbers, said shock absorbers moving inside cylinders under the action of a pressure difference, said separators being made up of an element of rubber or the like combined with a metal reinforcement, characterized by the fact that the floating piston comprises at least a fluid tightness bead, each extending over a slight part of the axial height of said piston, the fluid tightness bead or beads being one piece with the rubber parts of the piston and having a greater diameter than that of the cylinder in which they slide so that it is subjected to a certain tight fitting when it is mounted in the cylinder, the metal reinforcement being arranged so that in relation to the fluid tightness beads it assures directly or indirectly the guiding of said piston.

In developing this general inventive idea, it is provided:

that several fluid tightness beads are arranged regularly spaced on the outside surface of the piston, separated by circumferential grooves, said grooves possible being filled with a lubricant;

that the piston comprises a cylindrical part adjusted with a slight play or very slight tight fitting in the cylinder assuring the guiding of said piston in the cylinder and that it comprises a fluid tightness bead extending over a slight part of the axial height of said piston;

that the fluid tightness bead has a cylindrical outside surface, delimited by sharp angles;

that the metal reinforcement is buried in the rubber of the piston and that is has the shape of a cylinder opened at both ends, one of the ends being closed by the bottom of the floating piston of rubber or the like;

that the metal reinforcement is cylindrical and constitutes the guiding part of the floating piston, the reinforcement being preferably made of aluminum alloy and arranged around an element of rubber or the like comprising a fluid tightness bead and the bottom of the floating piston; and that the metal reinforcement is in the shape of a cup and that at least the fluid tightness bead is made of rubber or the like covering a surface corresponding to said cup.

By way of example and to make understanding of the following description easier, there are represented on the accompanying drawings:

FIG. 1 a lengthwise section of an embodiment of the floating piston that is not satisfactory.

Figure 2:
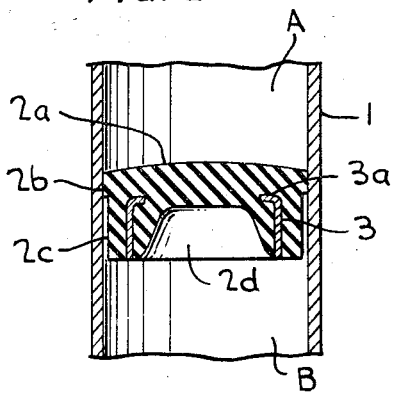

FIG. 2, a lengthwise section according to a first embodiment of the invention.

Figure 3:
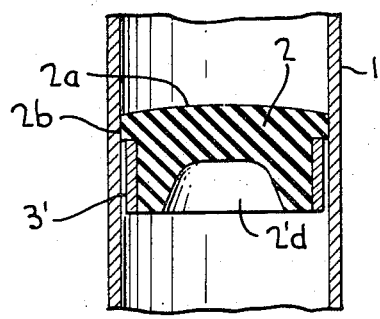

FIG. 3, a lengthwise section of a variant according to a second embodiment.

Figure 4:
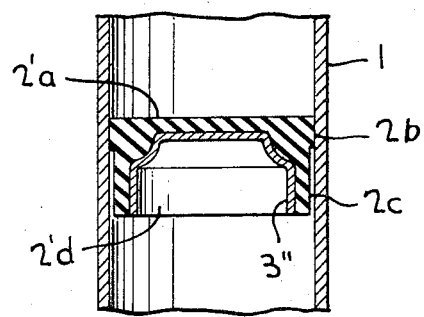

FIG. 4, a lengthwise section according to a third embodiment.

Figure 5:
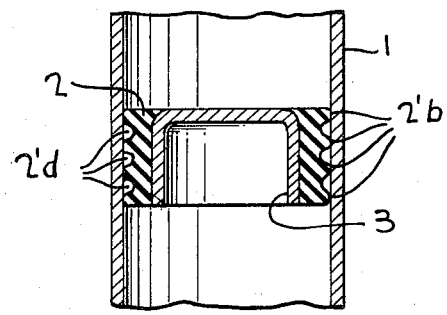

FIG. 5, a lengthwise section according to a fourth embodiment.

Referring to these figures, it can be seen that cylinder 1 contains floating piston 2 of rubber or any other material presenting a suitable elasticity, a good resistance to fluids present. A metal reinforcement 3, preferably of steel, is inserted during molding of the rubber. This reinforcement 3 can present a reversed L section 3a as shown in FIG. 2, leading to good resistance to deformations. It can, nevertheless, present any other shape, in particular, it can be cylindrical. The unit assures isolation of areas A and B.

Rubber element 2 presents four distinct zones:

zone 2a forming the base of floating piston 2;

zone 2b mounted with tight fitting in cylinder 1 assuring fluid tightness and presenting an outside surface that is preferably cylindrical but able to have any other profile;

zone 2c assuring the guiding, by using the good rubber qualities of the rubber on the steel in the presence of oil, this zone 2c sliding in cylinder 1 with a slight play or a very slight tight fitting;

zone 2d forming an annular flange or heel portion assures a good seating or guiding of the floating piston during emplacement.

Metal reinforcement 3 is intended to give a good stability to the assembly and to control the interferences between zone 2a forming the base of piston 2 and the zone 2b assuring fluid tightness.

In FIG. 3, the floating piston presents the same general shape, but reinforcement 3' here is outside rubber element 2.

In this case, reinforcement 3' directly assures the guiding and is preferably made of aluminum alloy. Reinforcement 3' is put in place either after molding of the rubber or during the molding operation.

When pressure difference occurs between areas A and B, the base or zone 2a is slightly deformed in one direction or the other which results in increasing the fluid tightness during sliding so that the dangers of leaks are reduced.

The floating piston assembly slides therefore in cylinder 1 guided by zone 2c until the reestablishment of equilibrium. With the design according to the invention, an identical sliding force in both directions and a deformation of the membrane having a tendency to reinforce the fluid tightness during sliding are obtained.

In the case of FIG. 4, the reinforcement is made up of a cup 3'' surrounded on the outside by rubber or the like. In this case, face 2'a is practically undeformed, but the tight fitting in zone 2b is generally sufficient for a good fluid tightness. It should be noted that this solution is very simple and it is even possible not to cover the bottom of the cup with rubber so that only zones 2b and 2c are covered with rubber.

In FIG. 5, is shown a solution with several fluid tightness beads 2'b separated by circumferential grooves 2'd. Reinforcement 3 is still made up of a cup covered on the outside surfaces with rubber or the like. Guiding is obtained by fluid tightness beads 2'b working with reinforcement 3 which is so arranged that in relation to said beads it assures a uniform distribution of the tight fitting and gives a suitable stiffness to the assembly. Grooves 2'd can be filled with lubricant, for example, grease before mounting.

I claim:

1. A floating piston device for use as a separator between two fluid bodies within a cylinder, such as that of an oleopneumatic shock absorber, said piston comprising a cup-like structure being constructed of rubber or other elastomeric material and having a closed marginal bearing base portion adapted to extend across the cylinder and of a thickness permitting only moderate flexure under pressure from one side of the piston or the other, and an annular open ended flange portion adapted to extend axially in the cylinder, said base portion being of an axial height comprising only a slight portion of the total axial height of the piston and being of a diameter slightly greater than that of the cylinder to insure a fluid-tight fit; the flange portion of the piston comprising the greater portion of the height of the piston being of an outside diameter slightly less than the internal diameter of the piston, thus insuring proper guidance into the cylinder when the piston is installed; said base portion having a purely cylindrical surface with sharp angular edges at both axial terminations; the flange portion of the piston being surrounded and engaged by a tubular ring of metal which abuts said base portion and which serves to reinforce both the guiding flange portion and the marginal bearing portions of the base of the piston.

2. A piston device as set forth in claim 1 in which the metal reinforcing ring is made of an aluminum alloy.

* * * * *